(12) United States Patent
Masui

(10) Patent No.: US 11,366,432 B2
(45) Date of Patent: Jun. 21, 2022

(54) DEAD TIME ESTIMATION DEVICE AND TEST DEVICE INCLUDING THE SAME

(71) Applicant: SINFONIA TECHNOLOGY CO., LTD., Tokyo (JP)

(72) Inventor: Yoji Masui, Tokyo (JP)

(73) Assignee: SINFONIA TECHNOLOGY CO., LTD., Tokyo (JP)

( * ) Notice: Subject to any disclaimer, the term of this patent is extended or adjusted under 35 U.S.C. 154(b) by 320 days.

(21) Appl. No.: 16/804,678

(22) Filed: Feb. 28, 2020

(65) Prior Publication Data

US 2020/0310363 A1  Oct. 1, 2020

(30) Foreign Application Priority Data

Mar. 26, 2019  (JP) ............... JP2019-058568

(51) Int. Cl.
*G05B 13/02* (2006.01)
*G05B 23/02* (2006.01)

(52) U.S. Cl.
CPC ....... *G05B 13/023* (2013.01); *G05B 23/0283* (2013.01)

(58) Field of Classification Search
CPC .................. G05B 13/023; G05B 23/0283
USPC ................................ 318/632, 560
See application file for complete search history.

(56) References Cited

U.S. PATENT DOCUMENTS 6,266,580 B1 * 7/2001 Asahara ............. G05B 13/0255
                                                      701/87
2003/0102383 A1  6/2003 Nanno et al.

FOREIGN PATENT DOCUMENTS

EP    2 839 983 A1    2/2015
JP    2003167605 A    6/2003

OTHER PUBLICATIONS

European Search Report issued in corresponding European Patent Application No. 20164669.2, dated Aug. 24, 2020 (11 pages).

(Continued)

*Primary Examiner* — David Luo
(74) *Attorney, Agent, or Firm* — Buchanan Ingersoll & Rooney PC

(57) ABSTRACT

A dead time estimation device capable of accurately estimating a dead time in a control system is provided. A dead time estimation device 6 includes a dead time calculation section 64 configured to obtain a dead time L^1 with which an evaluation function J in Equation (1) is at minimum

[Equation 7]

$$J = \int |\hat{G}/e^{-\hat{L}^1 s} - \hat{G}^1| df \qquad (1)$$

where $\hat{G}/e^{-\hat{L}^{\wedge 1} s}$ is a frequency characteristic of an element from which a dead time element is removed from a transfer function of a control target P and $\hat{G}^1$ is a transfer function not including the dead time element in the control target P.

7 Claims, 9 Drawing Sheets

(56) References Cited

OTHER PUBLICATIONS

Gerrad Duffy et al."An on-line process dead-time estimation algorithm", Asian Control Conference (ASCC), IEEE, Dec. 17, 2017, pp. 339-344.
Controlguru "Dead Time is the "how much Delay" Variable", URL: Https://controlguru.com/dead-time-is-the-how-much-delay-variable/#:~:itext:Dead%20time%20is%20the%20delay,thing%20a%20control%20loop, Apr. 2, 2015, 6 pages.
P Suranek et al. Experimental identification of LTI system using white noise excitation, Engineering Mechanics, May 14, 2018, pp. 833-836.
L. Keviczky et al. "An Adaptive PID regulator based on time delay estimation", Proceedings of the Conference on Decision and Control. Tuscon; vol. 4, Dec. 16, 1992, pp. 3243-3248.

\* cited by examiner

DEAD TIME ESTIMATION DEVICE AND TEST DEVICE INCLUDING THE SAME

CROSS-REFERENCES TO RELATED APPLICATIONS

The present application claims priority under 35 U.S.C. § 119 to Japanese Patent Application No. 2019-058568, filed Mar. 26, 2019. The contents of the application is incorporated herein by reference in their entirety.

TECHNICAL FIELD

The present teaching relates to a dead time estimation device for estimating a dead time in a control target and also relates to a test device including the dead time estimation device.

BACKGROUND ART

In controlling a control target, it is known that an instruction to be actually input to the control target is delayed relative to an input instruction because of, for example, a sampling period and communication in a control device. Such a delay is generally called a dead time. This dead time is known to affect control of the control target.

In PID control, for example, responsiveness cannot be enhanced because of the influence of a dead time in some cases.

To enhance responsiveness in control, in a control device disclosed in Patent Document 1, for example, dead time compensation control of applying an output of a dead time compensator is performed on an input side of an operation amount calculation means for calculating an operation amount relative to a control target based on a target value and a feedback value. That is, the control device performs dead time compensation control by so-called Smith compensation in target response.

Accordingly, a response value of a control target is allowed to reach a target value quickly, and occurrence of an overshoot is suppressed.

CITATION LIST

Patent Document

[Patent Document 1] Japanese Patent Application Publication No. 2003-167605

SUMMARY OF THE INVENTION

Technical Problem

In case that dead time compensation control as described above is performed, accuracy in estimating a dead time in a control target is important. Specifically, in performing the dead time compensation control, since a feedback value is adjusted in accordance with the dead time in the control target, the presence of an error of the dead time affects control performance of the dead time compensation control.

The accuracy in estimating the dead time is important because of the influence not only on the dead time compensation control, but also on control performance in other control-system designs affected by the dead time.

It is therefore an object of the present teaching is to provide a dead time estimation device capable of accurately estimating a dead time in a control target.

Solution to Problem

A dead time estimation device according to one embodiment of the present teaching is a dead time estimation device that estimates a dead time in a control target. The dead time estimation device includes a dead time calculation section configured to obtain a dead time $L^{\wedge}1$ with which an evaluation function J in Equation (1) is at minimum, wherein the dead time estimation device satisfies:

[Equation 1]

$$J=\int |\hat{G}/e^{-L^{\wedge}1 s} - \hat{G}'| df \qquad (1)$$

where $\hat{G}/e^{-L^{\wedge}1 s}$ is a frequency characteristic of an element from which a dead time element is removed from a transfer function of the control target and $\hat{G}'$ is a transfer function including no dead time element in the control target (first configuration).

With this configuration, the dead time in the control target can be accurately estimated. Specifically, in the evaluation function in Equation (1) expressed by using a frequency characteristic of an element obtained by removing a dead time element from a transfer function of the control target and a transfer function including no dead time element of the control target, using a dead time and a transfer function from which the dead time is removed as variables, a dead time with which the evaluation function is at minimum is obtained so that the dead time in the control target can be thereby accurately estimated.

Thus, the control target is controlled by using the dead time estimated by the dead time estimation device so that the control target can be thereby controlled with the designed control system with suppression of the influence of an error in estimating the dead time.

In the first configuration, the dead time estimation device may further include a dead time initial value acquisition section configured to obtain a dead time initial value of the control target; and a frequency characteristic acquisition section configured to obtain the dead time element by using the dead time initial value and to obtain, as $\hat{G}/e^{-L^{\wedge}1 s}$, a frequency characteristic of the element from which the dead time element is removed from the transfer function of the control target (second configuration).

With this configuration, the dead time in the control target can be accurately estimated in a short time. Specifically, the dead time initial value acquisition section is capable of obtaining a value closer to a true value of the dead time of the control target as a dead time initial value. Thus, a more accurate dead time initial value can be used for a dead time that is taken into consideration in Equation (1) used for calculation in the dead time calculation section. Accordingly, the dead time calculation section is capable of quickly obtaining the dead time in the control target.

In the second configuration, the dead time calculation section may obtain the dead time $L^{\wedge}1$ with which the evaluation function J is at minimum within a predetermined range with respect to the dead time initial value (third configuration).

With this configuration, even in a case where the dead time initial value cannot be obtained accurately, the dead time calculation section is capable of accurately estimating a dead time in the control target.

In the second or third configuration, the dead time estimation device may further include a transfer function acquisition section configured to input a signal to the control target and acquire a transfer function from a response result of the signal. The dead time initial value acquisition section may obtain the dead time initial value from a response signal obtained in a case of inputting a predetermined input signal to the control target having the transfer function acquired by the transfer function acquisition section (fourth configuration).

With this configuration, even in a case where the dead time initial value cannot be obtained by inputting an input signal to the control target, after the transfer function of the control target is obtained, the dead time initial value can be obtained from the response signal in the case of inputting a predetermined input signal to the transfer function. Thus, the dead time initial value of the control target can be accurately obtained.

In the fourth configuration, the dead time initial value acquisition section may obtain, as the dead time initial value, a duration to when the response signal exceeds a predetermined threshold (fifth configuration). Accordingly, the dead time initial value in the control target can be easily obtained.

In the fourth or fifth configuration, the predetermined input signal may be a step signal (sixth configuration). Accordingly, the dead time initial value in the control target can be easily obtained by using the step response to the transfer function.

A test device according to one embodiment of the present teaching includes: a control target configured to apply a driving force to a test specimen; a control device configured to control the control target; and the dead time estimation device according to any one of first to sixth configurations configured to output an estimated dead time to the control device (seventh configuration).

With this configuration, in the test device for the test specimen, the dead time estimation device can accurately estimate a dead time in the control target that applies a driving force to the test specimen. Accordingly, the control target can be controlled by the designed control system. Thus, the test device can be accurately driven.

Advantageous Effects of Invention

A dead time estimation device according to one embodiment of the present teaching obtains a dead time $L^{\wedge}1$ with which the evaluation function J in Equation (1) is at minimum, where $G^{\wedge}/e^{-L^{\wedge}1s}$ is a frequency characteristic of an element obtained by removing a dead time element from a transfer function of a control target, and $G^{\wedge}$ is a transfer function including no dead time element of the control target. With this configuration, the dead time in the control target can be accurately estimated.

DETAILED DESCRIPTION

Figure 1:
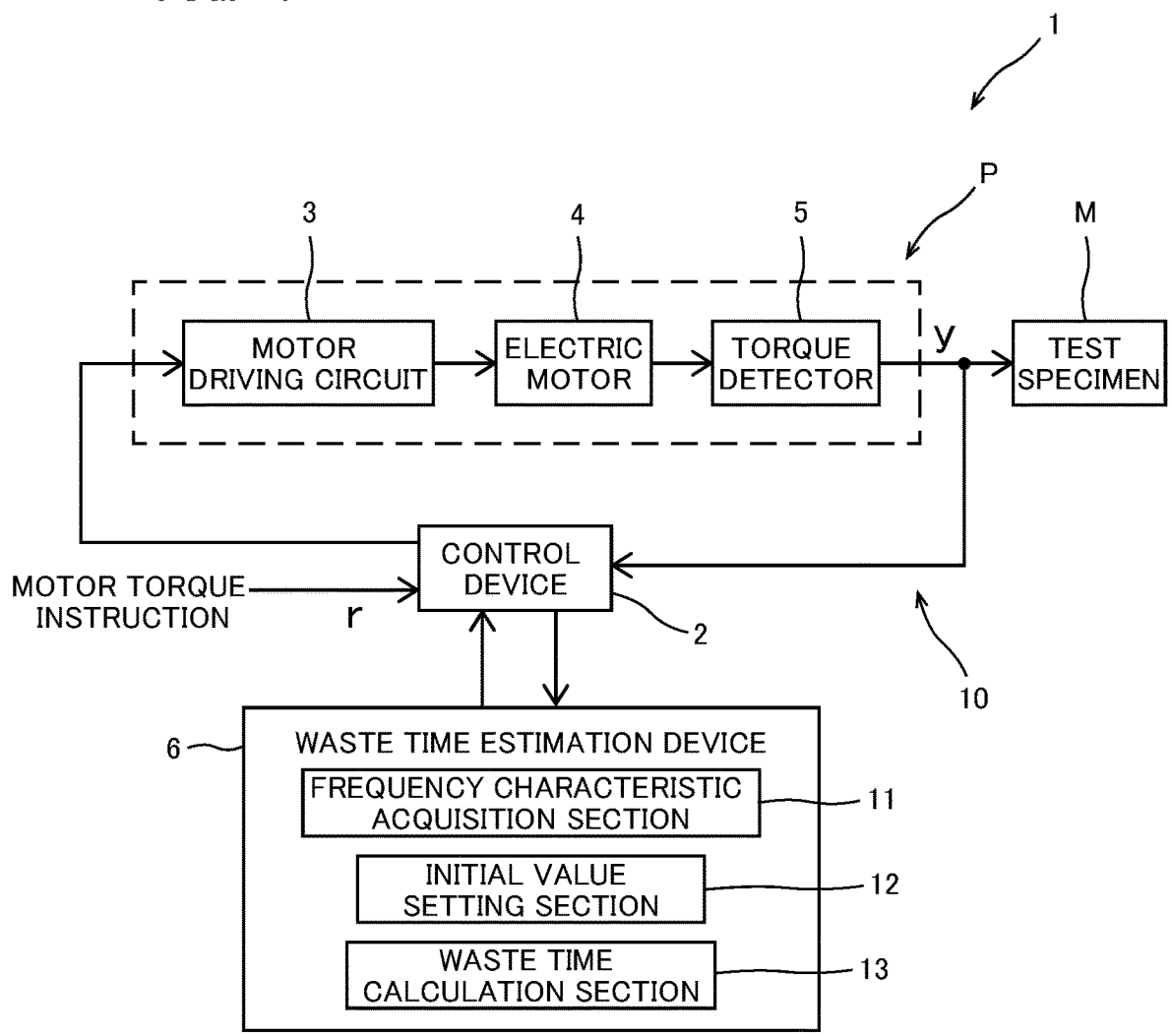
FIG. 1 is a functional block diagram illustrating a schematic configuration of a test device including a dead time estimation device according to a first embodiment.

An embodiment of the present teaching will be described in detail with reference to the drawings. In the drawings, the same or corresponding parts are denoted by the same reference numerals, and the description thereof will not be repeated.

First Embodiment (Overall Configuration)

FIG. 1 is a functional block diagram illustrating a schematic configuration of a test device 1 including a dead time estimation device 6 according to a first embodiment of the present teaching. The test device 1 is a test device for testing characteristics of a test specimen M such as a motor of an automobile. The test specimen M used for a test by the test device 1 may be a rotation body other than a motor.

Specifically, the test device 1 includes a control device 2, a motor driving circuit 3, an electric motor 4, a torque detector 5, and the dead time estimation device 6.

The control device 2 generates a drive instruction to the motor driving circuit 3 using a motor torque instruction r as an input instruction and a feedback value described later. The control device 2 includes a feedback loop 10 for negative feedback of the motor torque instruction r by using an output value of the torque detector 5 (see FIG. 2). A configuration in which the control device 2 generates the drive instruction is similar to a conventional configuration, and thus, the control device 2 will not be described in detail. The configuration of the feedback loop 10 will be described later.

Although not specifically shown, the motor driving circuit 3 includes a plurality of switching elements. The motor driving circuit 3 supplies electric power to an unillustrated coil of the electric motor 4 by driving of the plurality of switching elements based on the drive instruction.

The electric motor 4 includes an unillustrated rotor and an unillustrated stator. With supply of electric power from the motor driving circuit 3 to a coil of the stator, the rotor rotates with respect to the stator. The rotor is coupled to the test specimen M through an unillustrated intermediate shaft to be rotatable together with the test specimen M. Accordingly, rotation of the rotor allows the electric motor 4 to output a torque to the test specimen M. The configuration of the electric motor 4 is similar to a configuration of a typical motor, and thus, the electric motor 4 will not be described in detail.

The torque detector 5 is disposed on the intermediate shaft connecting the electric motor 4 and the test specimen M to each other. The torque detector 5 detects a torque output from the electric motor 4. An output value of the torque detected by the torque detector 5 is input to the control device 2 as an input value of the feedback loop 10. That is, the output value of the torque detector 5 is used for feedback control. The configuration of the torque detector 5 is similar to a conventional configuration, and thus, the torque detector 5 will not be described in detail.

Figure 2:
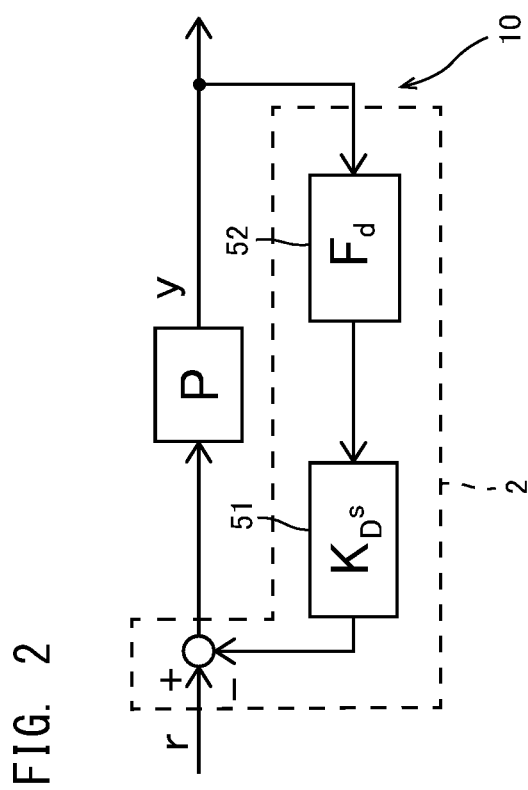
FIG. 2 is a block diagram of a control device according to the first embodiment.

In this embodiment, as illustrated in FIG. 2, the control device 2 includes the feedback loop 10 for feedback of the output value of the torque detector 5 to the motor torque instruction r as an input instruction. That is, the test device 1 of this embodiment controls driving of the electric motor 4 with a control system including the control device 2, the motor driving circuit 3, the electric motor 4, and the torque detector 5 and not including the test specimen M.

In FIG. 2, r represents a target value as a motor torque instruction, y represents an output value of the torque detector 5, $K_D$ represents a differential coefficient, s represents a derivative element, and $F_d$ represents a transfer function of a filter 52.

In FIG. 2, P represents a control target. In this embodiment, the control target P includes the motor driving circuit 3, the electric motor 4, and the torque detector 5. The control target P also includes a portion from the electric motor 4 to the torque detector 5 in the intermediate shaft connecting the electric motor 4 and the test specimen M to each other. That is, the control target P applies a driving force to the test specimen M.

The feedback loop 10 is a differential feedback system including the derivative element s. The feedback loop 10 receives the output value of the torque detector 5. The feedback loop 10 includes an attenuation ratio adjuster 51 and the filter 52. The attenuation ratio adjuster 51 adjusts an attenuation ratio with respect to the control target by using the derivative element s and the differential coefficient $K_D$. The filter 52 removes the influence of the dead time from the output value of the torque detector 5. In the feedback loop 10, the output value of the torque detector 5 is processed by the filter 52 and the attenuation ratio adjuster 51, and then negatively fed back to the motor torque instruction r as a feedback value.

In controlling the control target P in the test device 1, a torque to be input to the test specimen M is delayed relative to the motor torque instruction r because of, for example, a sampling period and communication of the control device 2. Such a delay is a so-called dead time, and affects control of the control target P.

Figure 3:
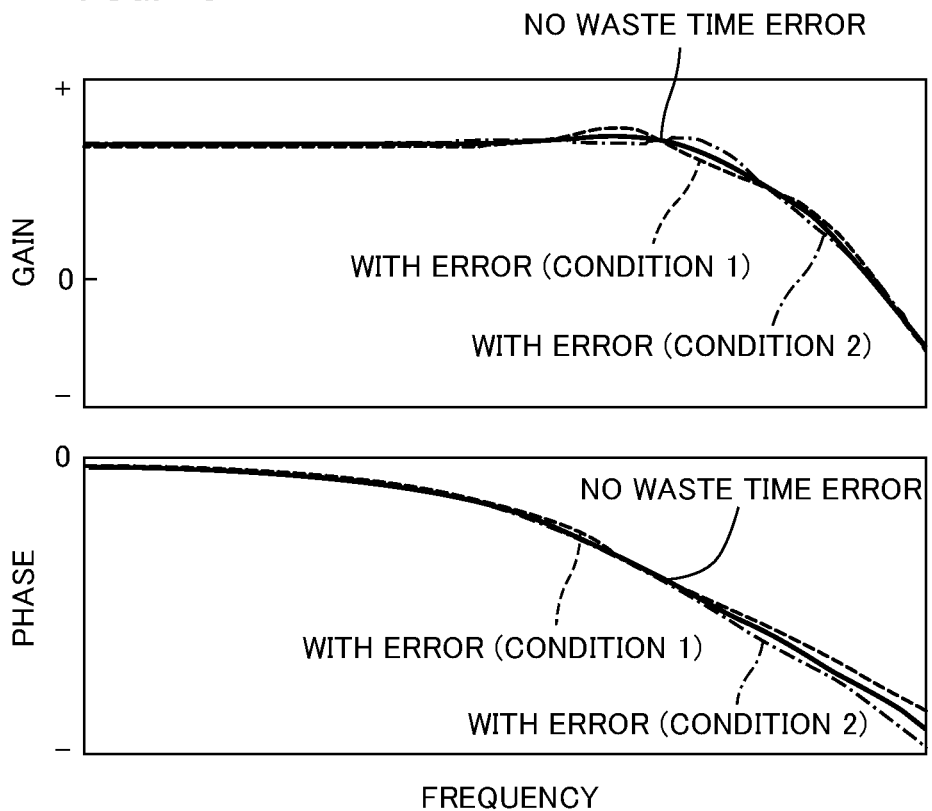
FIG. 3 is a Bode diagram in the case of using a control system for describing a difference depending on accuracy in estimating a dead time.

Thus, in designing a control system in consideration of the dead time, it is necessary to estimate a dead time of the control target P accurately in order to control the control target P by using the estimated dead time. For example, in the case of designing a feedforward control system in consideration of a dead time, as shown in FIG. 3, if the estimated dead time includes an error relative to a case where the estimated dead time includes no error (indicated by solid lines in FIG. 3), actual control performance is different from designed control performance as indicated by broken lines or dot-dash lines.

The dead time estimation device 6 estimates a dead time of the control target P. In this embodiment, the dead time estimated by the dead time estimation device 6 is used for consideration of influence of the dead time from the output value of the torque detector 5 in the filter 52 of the control device 2.

In the following description, for convenience of writing, "^" that should be attached above each character in expressions and drawings is attached behind the character.

As illustrated in FIG. 1, the dead time estimation device 6 includes a frequency characteristic acquisition section 11, an initial value setting section 12, and a dead time calculation section 13.

The frequency characteristic acquisition section 11 inputs a random signal (signal) to the control target P and acquires a frequency characteristic G (response result). The random signal is a signal having an unpredictable fluctuation. In this embodiment, as the random signal, a signal of white noise is used, for example.

The initial value setting section 12 acquires a transfer function which is used by the dead time estimation device 6 and from which a dead time initial value L^1 and a dead time element are removed. The transfer function from which the dead time initial value and the dead time element are removed may be previously stored in an unillustrated memory section or may be obtained from data input to the dead time estimation device 6.

The dead time calculation section 13 obtains L^1 with which the evaluation function J in Equation (1) is at minimum, where Equation (1) uses, as variables, the dead time initial value L^1 obtained by the initial value setting section 12 and a transfer function $G^{\wedge}/e^{-L^{\wedge_1 s}}$ from which a dead time element is removed, and is constituted by a frequency characteristic $G^{\wedge_1}$ of the transfer function $G^{\wedge}/e^{-L^{\wedge_1 s}}$ and the variables. Specifically, the dead time calculation section 13 obtains an optimum solution by a method such as a simplex method, using Equation (1).

[Equation 2]

$$J=\int |\hat{G}/e^{-\hat{L}'_1 s}-\hat{G}'|df \qquad (1)$$

The dead time L^1 in the control target P is obtained from Equation (1) as described above so that the dead time L^1 can be thereby accurately obtained.

The test device 1 includes the dead time estimation device 6 having the configuration described above. Thus, the dead time in the control target P that applies a driving force to the test specimen M can be accurately estimated. Accordingly, the control target P can be controlled with a designed control system. As a result, the test device 1 can be accurately driven with reduction of influence of an error in estimating the dead time.

(Operation of Dead Time Estimation Device)

Next, an operation of the dead time estimation device 6 having the configuration described above will be described with reference to a flow shown in FIG. 4.

Figure 4:
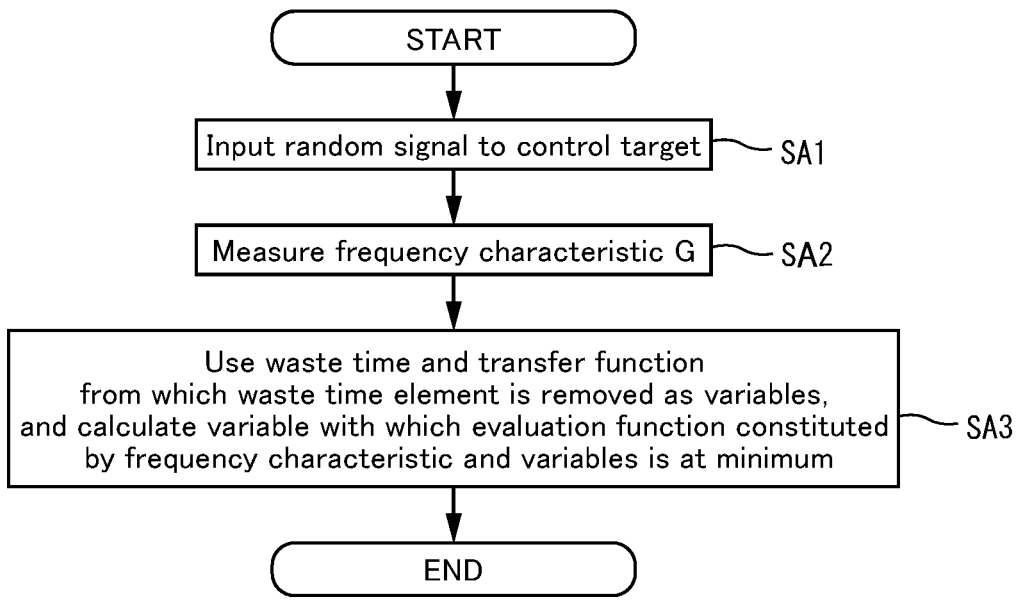
FIG. 4 is a flowchart depicting an example of an operation of the dead time estimation device.

When the flow shown in FIG. 4 starts, the frequency characteristic acquisition section 11 of the dead time estimation device 6 inputs a random signal to the control target P in step SA1. In subsequent step SA2, the frequency characteristic acquisition section 11 measures a frequency characteristic G from an output in inputting the random signal to the control target P.

Thereafter, in step SA3, the dead time calculation section 13 obtains L^1 with which the evaluation function J in Equation (1) described above is at minimum, where Equation (1) uses, as variables, the dead time initial value L^1 acquired by the initial value setting section 12 and the transfer function $G^{\wedge}/e^{-L^{\wedge_1 s}}$ from which the dead time element is removed, and is constituted by the frequency characteristic $G^{\wedge_1}$ of the transfer function $G^{\wedge}/e^{-L^{\wedge_1 s}}$ and the variables. Specifically, the dead time calculation section 13 obtains an optimum solution by a method such as a simplex method, from Equation (1).

As a result, the dead time L^1 of the control target P can be accurately obtained.

Second Embodiment (Overall Configuration)

Figure 5:
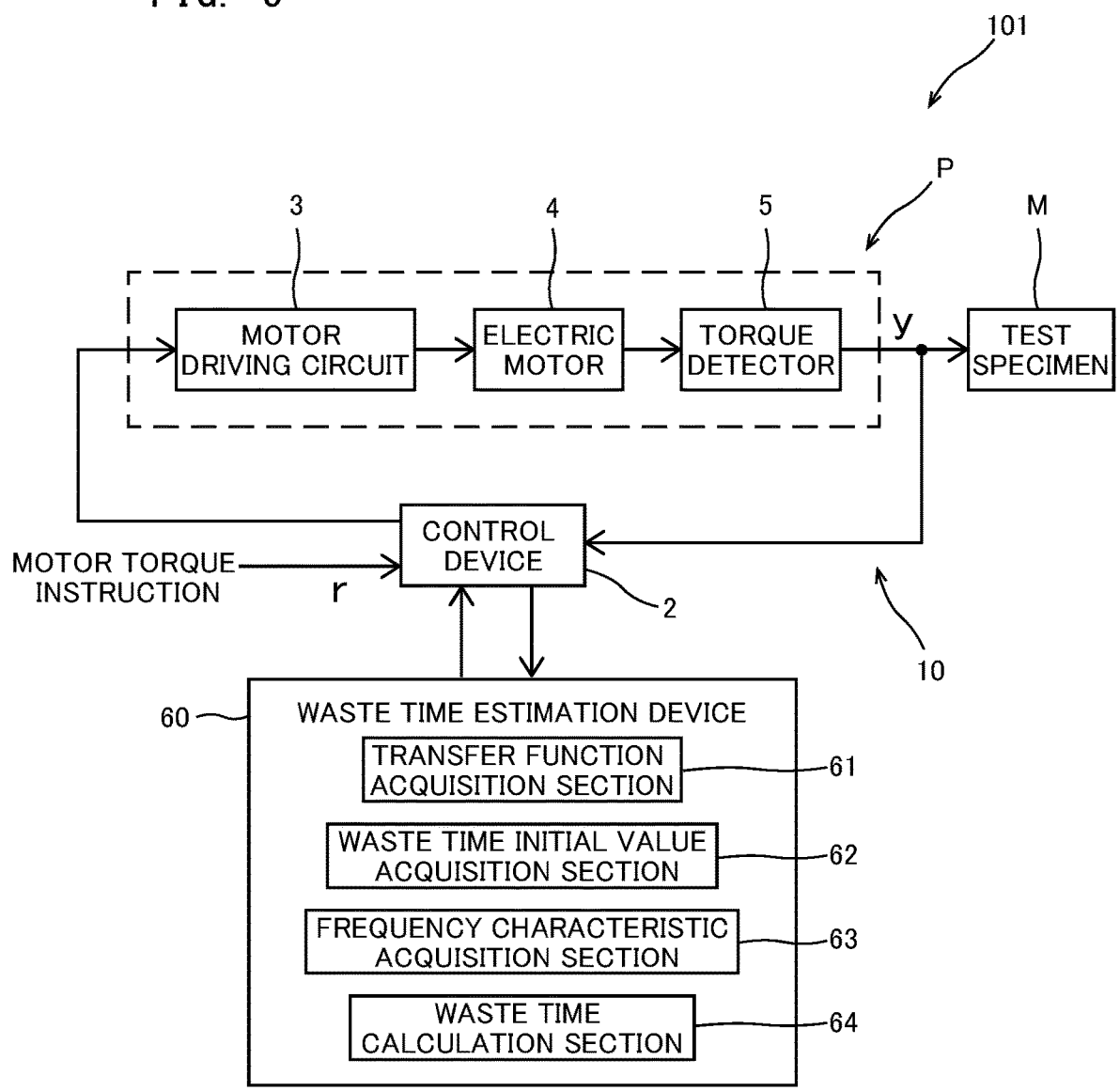
FIG. 5 is a functional block diagram illustrating a schematic configuration of a test device including a dead time estimation device according to a second embodiment.

FIG. 5 is a functional block illustrating a schematic configuration of a test device 101 including a dead time estimation device 60 according to a second embodiment. The test device 101 has the same configuration as that of the test device 1 of the first embodiment, except for a configuration of the dead time estimation device 60. Thus, in the following description, components similar to those of the first embodiment are denoted by the same reference characters and will not be described again, and components different from those of the first embodiment will be described.

In the following description, for convenience of writing, "^" that should be attached above each character in expressions and drawings is also attached behind the character.

As illustrated in FIG. 5, the dead time estimation device 60 includes a transfer function acquisition section 61, a dead time initial value acquisition section 62, a frequency characteristic acquisition section 63, and a dead time calculation section 64.

Figure 6:
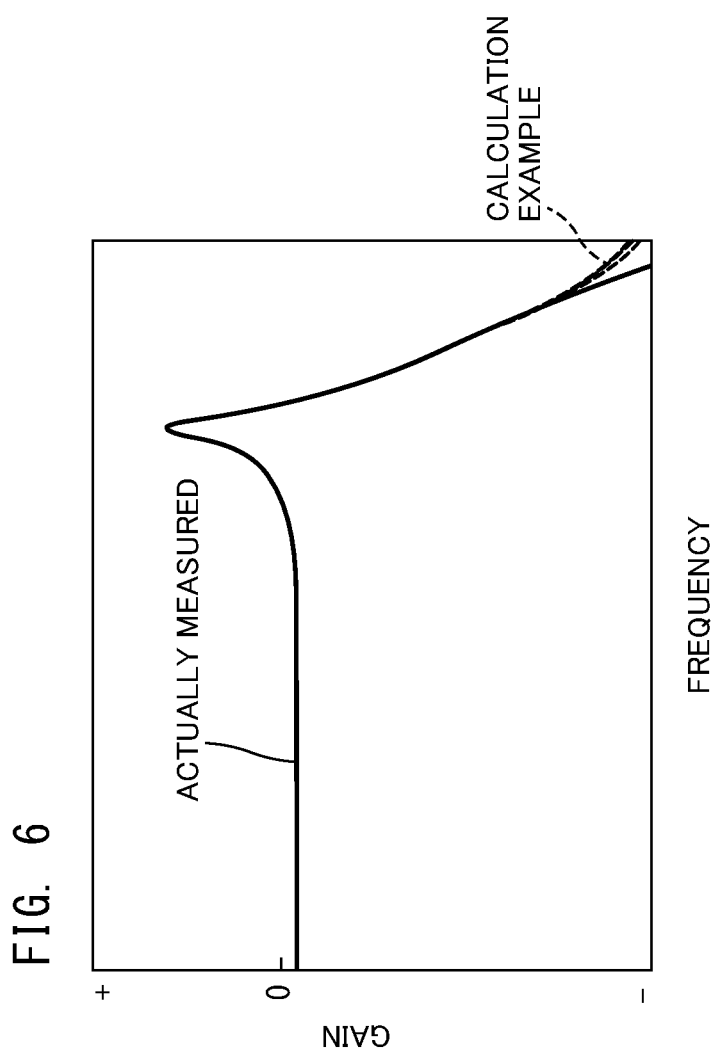
FIG. 6 is a graph showing an example of a relationship between a frequency characteristic measured by inputting a random signal to a control target, and a transfer function obtained by using an evaluation function.

The transfer function acquisition section 61 acquires a transfer function G^ of a control target P from a frequency characteristic G (response result) obtained by inputting a random signal (signal) to the control target P. In FIG. 6, an example of the frequency characteristic G obtained by inputting the random signal to the control target P is indicated by a solid line. The transfer function G^ is a transfer function that is used for acquiring a dead time initial value L^1 in the dead time initial value acquisition section 62 described later. The random signal is a signal having an unpredictable fluctuation. In this embodiment, as the random signal, a signal of white noise is used, for example.

The transfer function acquisition section 61 obtains a transfer function GA with which an evaluation function J0 in Equation (2) is at minimum. Specifically, the transfer function acquisition section 61 obtains orders of the denominator and the numerator, values of $a_0$ to $a_m$ and values of $b_0$ to $b_n$ in a general formula of a transfer function shown in Equation (3) such that the evaluation function J0 in Equation (2) is at minimum. In FIG. 6, an example of a calculation result (calculation example) of a transfer function obtained by repetitive computation in obtaining the transfer function G^ with which the evaluation function J0 is at minimum is indicated by broken lines.

[Equation 3]

$$J0 = \int |G - \hat{G}| df \quad (2)$$

[Equation 4]

$$\frac{b_0 s^n + b_1 s^{n-1} + \cdots + b_{n-1} s + b_n}{a_0 s^m + a_1 s^{m-1} + \cdots + a_{m-1} s + a_m} \quad (3)$$

Figure 7:
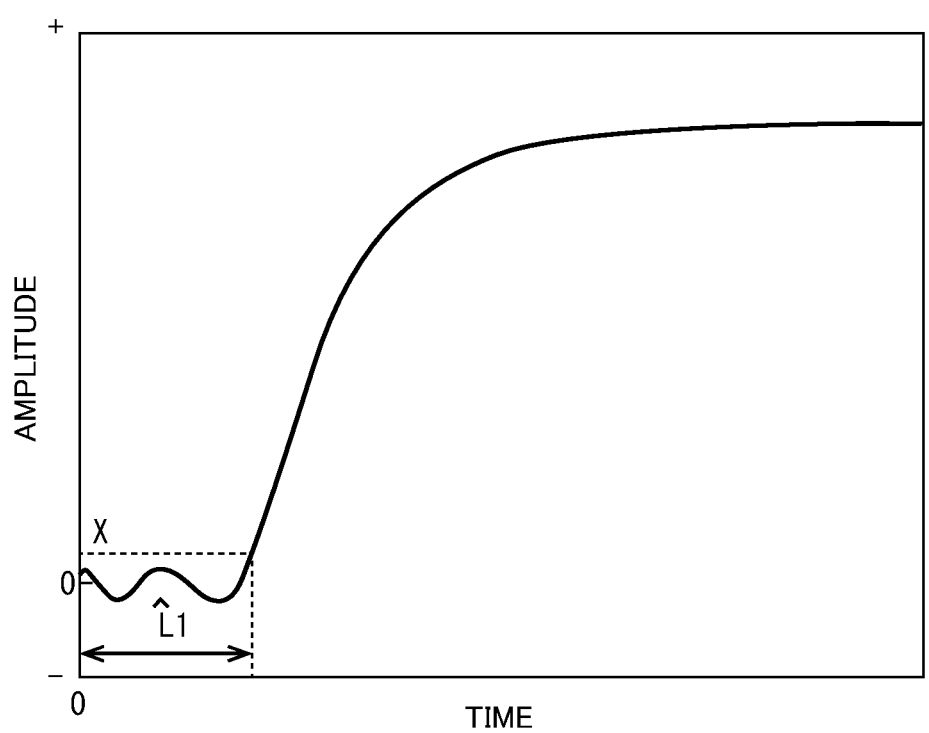
FIG. 7 is a graph showing an example of a step response.

The dead time initial value acquisition section 62 acquires a dead time initial value L^1 of the control target P using the transfer function G^ acquired by the transfer function acquisition section 61. Specifically, the dead time initial value acquisition section 62 acquires the dead time initial value L^1 from a step response obtained by inputting a step signal (predetermined input signal) to a model of the control target P having the transfer function G^. FIG. 7 shows an example of the step response. In this embodiment, as shown in FIG. 7, the dead time initial value acquisition section 62 acquires, as a dead time initial value L^1, a duration from when the step signal is input (time 0 in FIG. 7) to when an output value exceeds a threshold X in the step response. The threshold X is set at a value of a predetermined proportion (e.g., 10%) of a convergence value in the step response, for example.

In the step response, the dead time initial value acquisition section 62 may acquire, as the dead time initial value L^1, a duration from when the step signal is input to when a movement average value of the output value exceeds the threshold.

In the case of inputting the step signal to a motor driven based on a torque instruction, the motor might continue to accelerate to reach the upper limit of the motor speed. For this reason, the step signal needs to be adjusted. On the other hand, as described above, the transfer function G^ of the control target P is obtained, and the step signal is input to the model having the transfer function G^ so that the step response is thereby obtained. By this process, the dead time initial value L^1 in the control target P can be obtained without direct input of the step signal to the control target P. Thus, the step signal does not need to adjusted, and the dead time initial value L^1 in the control target P can be easily acquired.

Figure 8:
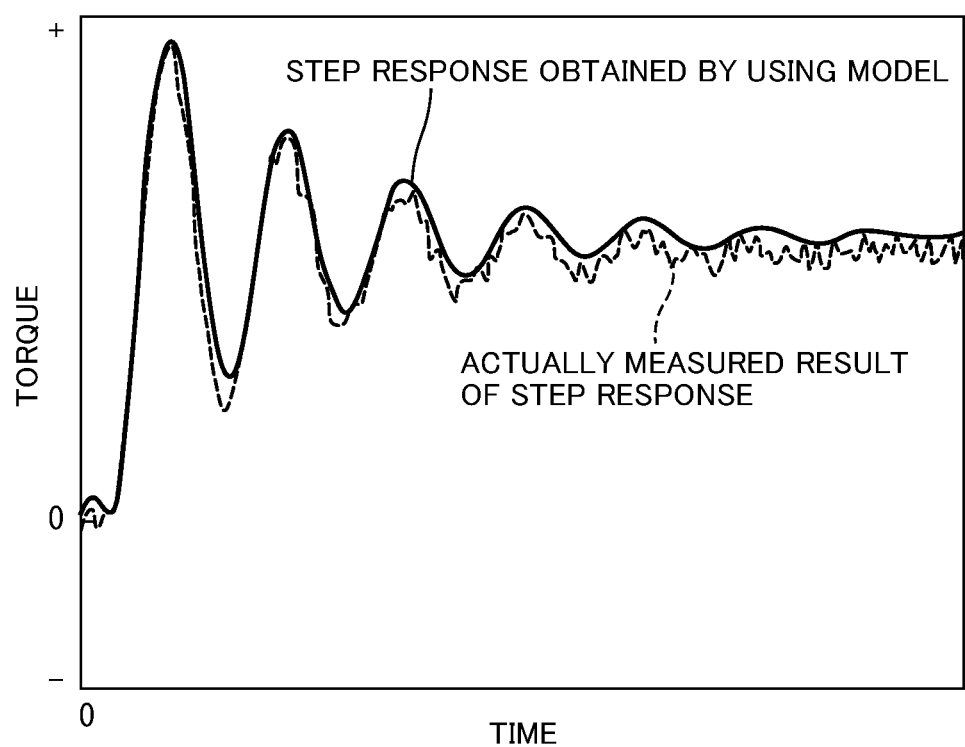
FIG. 8 is a graph showing a comparison between an example of an actually measured step response and an example of a step response obtained by using a model.

In addition, by obtaining the dead time initial value L^1 in the manner described above, it is possible to reduce the influence of noise on the step response of the model having the transfer function G^ through noise processing in at least one of the process of acquiring the frequency characteristic G of the control target P or the process of estimating the transfer function G^. FIG. 8 shows a comparison between an actually measured result of a step response and a step response obtained by using the model having the transfer function G^ as described above. As shown in FIG. 8, frequency characteristics with small noise can be obtained. Accordingly, the dead time initial value L^1 can be easily acquired from the step response.

The dead time initial value may be acquired from a step response obtained by inputting a step signal to the control target P. In this case, in the acquired step response, a duration from when the step signal is input to when the output value exceeds the threshold X may be acquired as the dead time initial value, or a duration from when the step signal is input to when a movement average value of an output value exceeds the threshold may also be acquired as the dead time initial value.

The frequency characteristic acquisition section 63 uses the transfer function G^ acquired by the transfer function acquisition section 61 and a dead time element $e^{-L^{\wedge\prime}1s}$ obtained by using a dead time initial value L^1 acquired by the dead time value acquisition section 62 to obtain a frequency characteristic of $G^{\wedge}/e^{-L^{\wedge\prime}1s}$ from which the dead time element obtained by using the dead time initial value L^1 is removed from the transfer function G^.

Here, L^'1 is, for example, a value satisfying the following relationships. It should be noted that L^'1 may be a value defined by another range with respect to L^1.

L^'1 min=L^1−L^1/10

L^'1 max=L^1+L^1/10

L^'1 min≤L^'1≤L^'1 max

The dead time calculation section 64 obtains L^'1 with which the evaluation function J in Equation (1) is at minimum.

[Equation 5]

$$J = \int |\hat{G}/e^{-\hat{L'}1s} - \hat{G'}| df \quad (1)$$

In Equation (1), $\hat{G}/e^{-L^{\wedge'}1s}$ may be derived by using $\hat{G}$ obtained by the transfer function acquisition section 61 or by using the frequency characteristic G obtained by inputting a random signal to the control target P.

In this manner, it is possible to obtain a value with which the evaluation function J in Equation (1) is at minimum in $L^{\wedge'}1$ satisfying $L^{\wedge}1$ min≤$L^{\wedge'}1$≤$L^{\wedge}1$ max. By obtaining the value which is within a predetermined range with respect to the dead time initial value $L^{\wedge}1$ and with which the evaluation function J in Equation (1) is at minimum, even in a case where the dead time initial value $L^{\wedge}1$ cannot be accurately obtained, a dead time of the control target P can be accurately estimated.

The dead time $L^{\wedge'}1$ in the control target P is obtained by using Equation as described above so that the dead time $L^{\wedge'}1$ can be thereby accurately obtained.

In addition, by obtaining the dead time initial value $L^{\wedge}1$ in the manner described in this embodiment, a dead time initial value closer to the dead time in the control target P can be obtained. Thus, the dead time in the control target P can be estimated more quickly compared with the configuration of the first embodiment.

(Operation of Dead Time Estimation Device)

Next, an operation of the dead time estimation device 60 having the configuration described above will be described with reference to a flow shown in FIG. 9.

Figure 9:
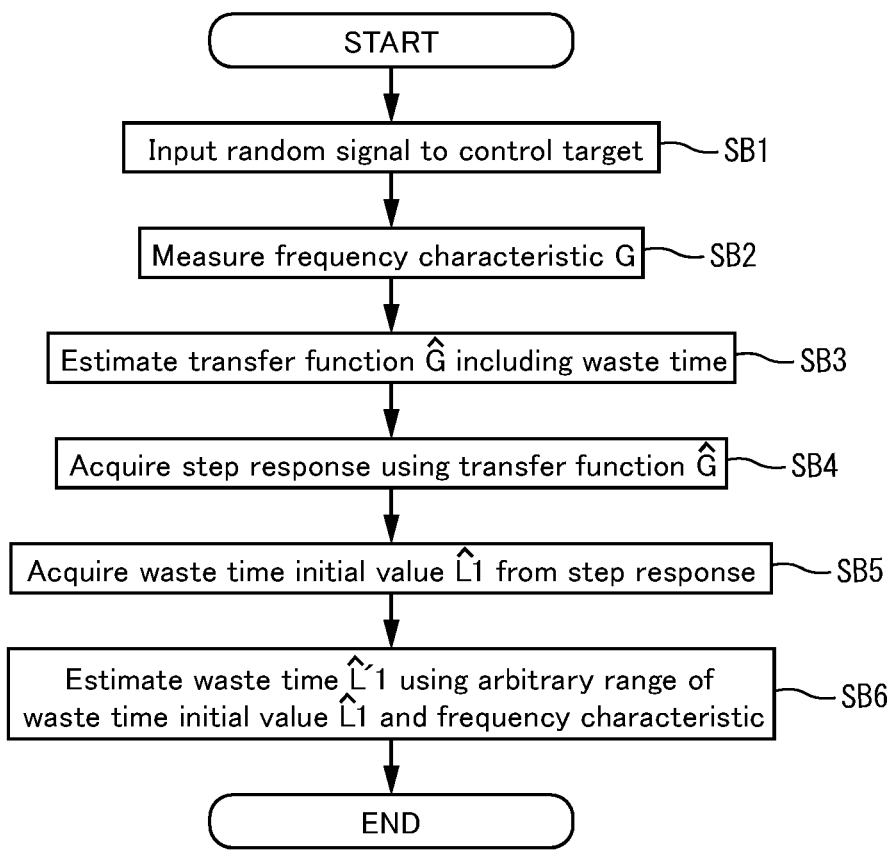
FIG. 9 is a flowchart depicting an example of an operation of the dead time estimation device.

When the flow shown in FIG. 9 starts, the transfer function acquisition section 61 of the dead time estimation device 60 inputs a random signal to the control target P in step SB1. In subsequent step SB2, the transfer function acquisition section 61 measures a frequency characteristic G from an output in inputting the random signal to the control target P. Thereafter, in step SB3, the transfer function acquisition section 61 uses the frequency characteristic G to estimate a transfer function $\hat{G}$ of the control target P such that the evaluation function J0 in Equation (2) is at minimum.

Subsequently, the dead time initial value acquisition section 62 inputs a step signal to a model of the control target P having the transfer function $\hat{G}$ and acquires a step response (step SB4). Then, the dead time initial value acquisition section 62 acquires a dead time initial value $L^{\wedge}1$ from the step response (step SB5). At this time, in the step response, the dead time initial value acquisition section 62 acquires, as the dead time initial value $L^{\wedge}1$, a duration from when the step signal is input to when an output value exceeds a threshold.

In next step SB6, the frequency characteristic acquisition section 63 obtains a frequency characteristic of $\hat{G}/e^{-L^{\wedge'}1s}$ from which a dead time element obtained by using the dead time initial value $L^{\wedge}1$ is removed from the transfer function $\hat{G}$ acquired in step SB3. Here, $L^{\wedge'}1$ is, for example, a value satisfying the following relationships.

$$L^{\wedge}1\ min = L^{\wedge}1 - L^{\wedge}1/10$$

$$L^{\wedge}1\ max = L^{\wedge}1 + L^{\wedge}1/10$$

$$L^{\wedge}1\ min \leq L^{\wedge'}1 \leq L^{\wedge}1\ max$$

Then, in step SB6, the dead time calculation section 64 obtains a dead time $L^{\wedge'}1$ in the control target P such that the evaluation function J in Equation (1) is at minimum.

As a result, the dead time $L^{\wedge'}1$ of the control target P can be accurately obtained.

Other Embodiments

The embodiments of the present teaching have been described above, but the above embodiments are merely examples for carrying out the present teaching. Thus, the present teaching is not limited to the embodiments, and the embodiments may be modified as necessary within a range not departing from the gist of the present teaching.

In the embodiments, the control device 2 includes the differential feedback system. Alternatively, the control device may include another control system as long as the control system is affected by the dead time in the control target.

Figure 10:
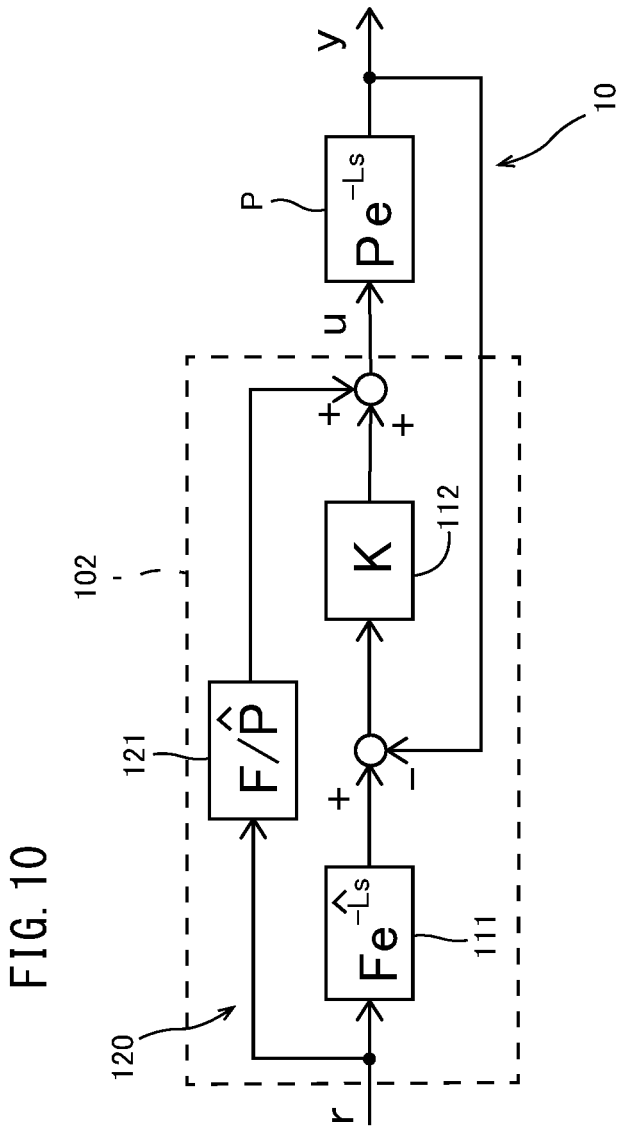
FIG. 10 is a block diagram of a control device according to another embodiment.

For example, the control device 102 may include a dual flexibility control system illustrated in FIG. 10. The control device 102 includes a feedforward loop 120. The control device 102 uses a reverse model of the transfer function in the feedforward loop 120. Thus, a transfer function from which a dead time is removed needs to be obtained. For this reason, to enhance control performance, the control device 102 is required of accurately estimating the dead time.

In FIG. 10, reference numeral 112 denotes a controller for a feedback system. Reference characters 111 and 121 denote controllers for a feedforward system.

In the second embodiment, the dead time initial value acquisition section 62 acquires the dead time initial value $L^{\wedge}1$ from the step response obtained by inputting the step signal to the model of the control target P having the transfer function $\hat{G}$. Alternatively, the dead time initial value acquisition section may acquire a dead time initial value from a ramp response in the model. That is, the dead time initial value acquisition section may input any type of signal to the model as long as the dead time initial value can be acquired from the response. In consideration of accuracy in the obtained dead time initial value, it is most preferable to obtain the step response from the model.

In the embodiments, the control target P includes the motor driving circuit 3, the electric motor 4, and the torque detector 5. Alternatively, the control target may include another configuration and/or include a shaft system having another configuration as long as the control target has a configuration capable of applying a driving force to a test specimen.

In each of the embodiments, the dead time estimation device 6, 60 is disposed in the test device 1. Alternatively, the dead time estimation device may be disposed in another device that requires estimation of a dead time, or may be configured as a single unit.

INDUSTRIAL APPLICABILITY

The present teaching is applicable to a dead time estimation device that estimates a dead time in a control target.

REFERENCE SIGNS LIST 1, 101 test device
2, 102 control device
3 motor driving circuit
4 electric motor
5 torque detector
6, 60 dead time estimation device
10 feedback loop
11, 63 frequency characteristic acquisition section
12 initial value setting section
13, 64 dead time calculation section
51 attenuation ratio adjuster 52 filter
61 transfer function acquisition section
62 dead time initial value acquisition section
112 controller for feedback system
120 feedforward loop
111, 121 controller for feedforward system
P control target
M test specimen

What is claimed is:

1. A dead time estimation device that estimates a dead time in a control target, the dead time estimation device comprising:
   a dead time calculation section configured to obtain a dead time $L^\wedge 1$ with which an evaluation function J in Equation (1) is at minimum, wherein
   the dead time estimation device satisfies:

[Equation 6]

$$J = \int |\hat{G}/e^{-L'_1 s} - \hat{G}'| df \tag{1}$$

where $\hat{G}/e^{-L^{\wedge_1} s}$ is a frequency characteristic of an element from which a dead time element is removed from a transfer function of the control target and $\hat{G}'$ is a transfer function not including the dead time element in the control target.

2. The dead time estimation device according to claim 1, further comprising:
   a dead time initial value acquisition section configured to obtain a dead time initial value of the control target; and
   a frequency characteristic acquisition section configured to obtain the dead time element by using the dead time initial value and to obtain, as $\hat{G}/e^{-L^{\wedge_1} s}$, a frequency characteristic of the element from which the dead time element is removed from the transfer function of the control target.

3. The dead time estimation device according to claim 2, wherein
   the dead time calculation section obtains the dead time $L^\wedge 1$ with which the evaluation function J is at minimum within a predetermined range with respect to the dead time initial value.

4. The dead time estimation device according to claim 2, further comprising
   a transfer function acquisition section configured to input a signal to the control target and acquire a transfer function from a response result of the signal, wherein
   the dead time initial value acquisition section obtains the dead time initial value from a response signal obtained in a case of inputting a predetermined input signal to the control target having the transfer function acquired by the transfer function acquisition section.

5. The dead time estimation device according to claim 4, wherein
   the dead time initial value acquisition section obtains, as the dead time initial value, a duration to when the response signal exceeds a predetermined threshold.

6. The dead time estimation device according to claim 4, wherein the predetermined input signal is a step signal.

7. A test device comprising:
   a control target configured to apply a driving force to a test specimen;
   a control device configured to control the control target; and
   the dead time estimation device according to claim 1 configured to output an estimated dead time to the control device.

* * * * *